(12) United States Patent  
Elliott

(10) Patent No.: US 9,072,973 B2  
(45) Date of Patent: Jul. 7, 2015

(54) INTERACTIVE PLAY STATION

(71) Applicant: Build-A-Bear Workshop, Inc., St. Louis, MO (US)

(72) Inventor: Brandon Elliott, St. Charles, MO (US)

(73) Assignee: Build-A-Bear Workshop, Inc., St. Louis, MI (US)

(*) Notice: Subject to any disclaimer, the term of this patent is extended or adjusted under 35 U.S.C. 154(b) by 177 days.

(21) Appl. No.: 13/792,107

(22) Filed: Mar. 10, 2013

(65) Prior Publication Data

US 2013/0324241 A1    Dec. 5, 2013

Related U.S. Application Data

(60) Provisional application No. 61/653,945, filed on May 31, 2012.

(51) Int. Cl.  
*A63F 13/12* (2006.01)  
*A63F 13/30* (2014.01)  
*A63F 13/00* (2014.01)  
*A63F 13/90* (2014.01)  
*A63F 13/80* (2014.01)  
*A63H 30/00* (2006.01)

(52) U.S. Cl.  
CPC ............... *A63F 13/12* (2013.01); *A63F 13/00* (2013.01); *A63H 2200/00* (2013.01); *A63F 13/90* (2014.09); *A63F 13/80* (2014.09); *A63H 30/00* (2013.01)

(58) Field of Classification Search  
CPC ......... A63F 13/12; A63F 13/00; A63F 13/02; A63F 13/06; A63F 3/00643; A63F 9/24; A63H 30/00; A63H 33/00; A63H 5/00; G06F 3/0488

USPC ....................................... 446/175; 463/30–34  
See application file for complete search history.

(56) References Cited

U.S. PATENT DOCUMENTS

| | | | |
|---|---|---|---|
| 5,334,022 A | 8/1994 | Kitagawa et al. | |
| 5,451,178 A | 9/1995 | Yorozu et al. | |
| 6,012,961 A | 1/2000 | Sharpe, III et al. | |
| 6,206,750 B1 | 3/2001 | Barad et al. | |
| 6,463,257 B1 | 10/2002 | Wood | |
| 6,547,635 B1 * | 4/2003 | Gildea | 446/479 |
| 6,761,634 B1 * | 7/2004 | Peterson et al. | 463/30 |

(Continued)

FOREIGN PATENT DOCUMENTS

| | | |
|---|---|---|
| EP | 2 311 536 A1 | 4/2011 |
| JP | 2008279165 A | 11/2008 |
| WO | 2004068452 A2 | 8/2004 |

OTHER PUBLICATIONS

International Search Report, International Patent Application No. PCT/US13/43308, mailed on Aug. 23, 2013, 12 pages.

(Continued)

*Primary Examiner* — Jay Liddle  
*Assistant Examiner* — Alex F. R. P Rada, II  
(74) *Attorney, Agent, or Firm* — Lewis Rice LLC

(57) ABSTRACT

An interactive play station designed to provide for play which utilizes digitally generated content, mechanical or other physical objects, and digital control to simulate a physical environment which physical objects can appear to interact with. In this regard, the play station is a mixed reality or augmented environment that comprises both real and virtual elements.

4 Claims, 9 Drawing Sheets

(56) References Cited

U.S. PATENT DOCUMENTS

| | | |
|---|---|---|
| 7,645,178 B1 * | 1/2010 | Trotto et al. ............ 446/268 |
| 8,128,450 B2 | 3/2012 | Imai |
| 8,287,327 B1 | 10/2012 | Ghaly |
| 8,358,286 B2 * | 1/2013 | Cannon ..................... 345/174 |
| 2001/0041494 A1 | 11/2001 | Barad et al. |
| 2001/0056359 A1 | 12/2001 | Abreu |
| 2002/0061707 A1 | 5/2002 | Barad et al. |
| 2002/0073191 A1 | 6/2002 | Perkowski |
| 2002/0106964 A1 | 8/2002 | Gaynor et al. |
| 2002/0117544 A1 | 8/2002 | Wolf et al. |
| 2002/0132553 A1 * | 9/2002 | Jelinek ..................... 446/268 |
| 2002/0142834 A1 | 10/2002 | Sobue |
| 2002/0169687 A1 | 11/2002 | Perkowski |
| 2002/0170961 A1 | 11/2002 | Dickson et al. |
| 2003/0083807 A1 | 5/2003 | Kuroda et al. |
| 2003/0110099 A1 | 6/2003 | Trajkovic et al. |
| 2003/0148698 A1 | 8/2003 | Koening |
| 2004/0074377 A1 | 4/2004 | Georges |
| 2004/0080530 A1 | 4/2004 | Lee |
| 2004/0214642 A1 | 10/2004 | Beck |
| 2005/0080666 A1 | 4/2005 | Treibetz et al. |
| 2005/0106991 A1 * | 5/2005 | Marine et al. ............ 446/296 |
| 2005/0148281 A1 | 7/2005 | Sanchez-Castro et al. |
| 2006/0234601 A1 | 10/2006 | Weston |
| 2006/0293101 A1 | 12/2006 | Kogo |
| 2007/0128979 A1 | 6/2007 | Shackelford et al. |
| 2007/0143679 A1 | 6/2007 | Resner |
| 2007/0236485 A1 * | 10/2007 | Trepte ..................... 345/207 |
| 2008/0263454 A1 | 10/2008 | Chan et al. |
| 2009/0068920 A1 | 3/2009 | Brielmann |
| 2009/0069084 A1 | 3/2009 | Reece et al. |
| 2009/0158210 A1 | 6/2009 | Cheng et al. |
| 2011/0021109 A1 | 1/2011 | Le et al. |
| 2012/0019480 A1 * | 1/2012 | Cannon ..................... 345/174 |
| 2012/0041839 A1 | 2/2012 | Weiss et al. |
| 2012/0046102 A1 | 2/2012 | Tully |
| 2013/0303047 A1 * | 11/2013 | Albert et al. ............ 446/175 |

OTHER PUBLICATIONS

International Search Report, International Patent Application No. PCT/US13/053774, mailed on Oct. 25, 2013, 10 pages.

International Search Report, International Patent Application No. PCT/US2012/037125, mailed Nov. 23, 2012, 8 pages.

* cited by examiner

INTERACTIVE PLAY STATION

CROSS REFERENCE TO RELATED APPLICATION(S)

This application claims the benefit of U.S. Provisional Patent Application Ser. No. 61/653,945 filed May 31, 2012, the entire disclosure of which is incorporated herein by reference.

BACKGROUND

1. Field of the Invention

This disclosure relates to systems and methods for providing a play station where physical, non-simulated objects can interact with a play environment including both visual and other sensory output without the need for the objects to be capable of digital communication.

2. Description of Related Art.

As the world has become more advanced, virtually every aspect of human existence has incorporated new technologies. In many respects, toys, generally objects used for play to train children for future life and often designed to be versions of objects used by adults, have been around for much of recorded human history. Because toys are often designed to teach intended behavior, toys have changed as the world has changed to allow for children to play with the type of objects they will experience as they grow older.

Prior to the invention of the telephone, there was no need for toy telephones. Similarly, prior to the invention of the automobile, there were no toy cars or trucks. While the types of toys emulate the environment and era in which children are growing up, toys also have gained increased functionality as the technology of the era has provided for better and safer ways to incorporate functionalities using devices that are often sophisticated machines more so than playthings.

As an example, an early toy telephone may have looked like a telephone, but it generally did not operate like a real telephone. However, as technology has improved, toy telephones have become more like the real thing. From mechanical bells and sounds, to recordings of parts of conversations, to modern toys that incorporate moveable buttons which control computer chips so that the telephone can be manipulated like a real telephone, toys have become increasingly "real".

One recent advancement in toys is the ability to operate in interactive environments, specifically digital environments such as the Internet or computer simulated worlds. For example, a physical toy may interact with a computer game where the toy is represented by an avatar, or may provide for the user to manipulate the toy and have that interaction be translated to an on-screen action. Such a toy's digital interaction is through computer components in the toy and a connection to a computer or other general interactive display device, such as a television. For example, a plush toy may "speak" when it receives a signal from an interactive device, such as a computer or television, when the user does something in an environment presented on the screen. The sounds issued will usually be connected to the activity on the display screen and therefore the toy can appear to interact with what is occurring on the screen.

These interactions are, however, limited in several very important ways. In the first instance, the interactions have traditionally required both the digital machine providing the environment, and the toy, to be digital devices. That is, they both have to have mutual communication protocols and electronic hardware within them. This can be expensive as, effectively, interactive toys must include a sophisticated machine to allow the toy to appear to interact. Further, such interaction can be power demanding, and changing batteries in a toy can be difficult or constantly changing batteries can be annoying. Still further, the inclusion of such devices can ruin the appearance or feel of toy (e.g., a soft plush toy is no longer soft, but now includes a hard chunk of electronics and batteries within it).

A second major limitation to such digitally interactive toys is that the environment is generally not an interactive play environment. Instead, the environment is a screen simulation of an interactive world. Thus, children are not playing within the environment (e.g., as they would with a toy kitchen) but are directing interaction in a simulated environment (e.g., manipulating an image of a kitchen on the screen). This is a less "natural" interaction and, as parents have become increasingly concerned with their children's screen time and the amount of time they spend with virtual play, the desire to provide children with immersive simulated environments, which only exist online or in a computer or television, have decreased. Instead, parents want more "hands-on" toys where a child is manipulating the toy directly, instead of via a computer interface device.

Because of the increase in available computing power, the ability to utilize digital control in all types of devices has become more common. However, while digital devices are commonly incorporated as control panels or as internal components, the control panel has not become a part of an interactive device in a fashion where the control aspect is designed to be camouflaged and still can interact with non-digital devices. That is, devices have not been provided where the digital aspect is somewhat hidden, where the digital aspect is combined to provide sensory stimulation as part of a larger more immersive play environment, and where non-digital toys can interact with the play environment.

This broader type of environment can allow for play with non-digital toys to be digitally interactive which provides for a much broader universe of toys to be used in the environment, and further provides that the cost of each toy is reduced because the inclusion of digital components to provide the interaction is not necessary. In addition, the play environment not being totally simulated can be desirable to provide for better development (e.g., of gross motor skills). Effectively, the computer system in the play station goes from simulating an environment, to being a control system or partial simulation within a real environment. This can be a much more immersive and realistic play experience.

In the last 15 years, the manufacturing process for toys also has become personalized through the advent of toy stores where the toy is not just purchased off of a rack, but is, at least partially, manufactured by the child. One such type of store is the Build-a-Bear Workshop® store where a person can construct a toy from a variety of components. Part of the entertainment value of the toy is the ability of the child to be a part of the toy's development. In these types of on-demand and self-service opportunities, the child is present for the toy's creation and construction, and the toy is often more personalized because the child has made personal decisions about the design of the toy. This can include decisions as to the toy's appearance and what additional components or functionality will be included.

In effect, the toy becomes more capable of reflecting the toy's owner because its owner is also, in many respects, its creator and builder. This is beneficial both for children who are making customized toys and for toys which are given to the child. The latter results in the toy often having a more personal connection as it is associated by the child with the person who made and gave the toy to the child because of the personalization. Further, the very process of building a toy is "play" which emulates modern manufacturing and construction techniques and can provide entertainment and learning as well. Further, toy stores are also increasingly becoming play destinations where the toy is viewed as a "friend" or "companion" allowed to take part in the child's activities instead of an inanimate object.

Personalization and anthropomorphism of toys by children as part of their play is not new. The "reality" of toys as things other than inanimate objects has been fertile ground for children's literature and entertainment for many years and virtually every child, at some time, sees a toy as more than just an object. It has long been recognized that children have a more difficult time separating fantasy from reality than adults and, therefore, such anthropomorphism is easily understood. Further, anthropomorphism of toys can allow a parent to use a child's imagination to assist in dealing with problems created by a child's imagination. Child rearing books are filled with examples of using a child's plush toy, in a child's imagination, as a powerful hero that can defend the child from a child's imagined "monsters under the bed."

Particularly when it comes to plush toys, the desire of children to anthropomorphize the toy can be strong. Such toys are very often comfort objects for children and are often used to calm and reassure children. A teddy bear going through an X-ray scanner prior to a child is a common image. Thus, there is often a natural push that plush toys are seen by children as real "people". This particular anthropomorphism, and the specificity with which it is associated with a particular plush toy, leads to a need for a play station where the particular plush toy, regardless of its construction, is able to interact with the play environment.

Thus, while many sophisticated plush toys include computer chips as part of their construction to allow interaction with other digital devices, it is often not desirable that the play environment requires a toy to be a digital device in order to interact. Instead, having a digital play area that can interact with non-digital devices, and, thus, has a much wider interactive ability, can be desirable. Further, having the play environment be hands-on, engage multiple senses, and provide for motor movement can be desirable.

SUMMARY

Because of these and other problems in the art, described herein, among other things, are systems and methods for providing an interactive play station. The play station is designed to provide for play which utilizes digitally generated content, mechanical or other physical objects, and digital control to simulate a physical environment. In this regard, the play station is a mixed reality or augmented environment that comprises both real and virtual elements. In other words, the simulation utilizes a tangible environment—not a mere virtual environment where the child interacts via an interaction device (such as, but not limited to a computer keyboard or pointer (mouse)) or via an avatar of themselves on the screen. It is an environment where they can touch, feel, smell, hear, and otherwise directly engage their senses and utilize motor skills outside of those required by interaction with mere simulation but which can result in virtual simulation (e.g., the appearance of washing/playing with water, as discussed more fully below).

In an embodiment, the digital control of the environment is camouflaged so that a child is not necessarily aware that they are providing digital input. Instead, the play station simply reacts to the child's actions. Further, the play station is designed to interact both with toys which are purposefully designed for such interaction, and also toys which are non-digital devices and which are not designed specifically for use with the play station.

Described herein, among other things, is an interactive play station comprising: a display, the display including; a screen for displaying a digitally generated image; and a read device, the read device being capable of detecting an object positioned in proximity to the display; and a toy; wherein, when the toy is placed in proximity to the screen, the read device detects the presence of the toy; wherein, once the toy is detected, the toy is identified as a particular type of toy; and wherein, once the type is identified, the display causes the screen to display digital content interactive with the toy.

In an embodiment of the interactive play station, the read device comprises an infrared emitter and scanner.

In an embodiment of the interactive play station, the read device comprises a camera.

In an embodiment of the interactive play station, the toy comprises a fixed interactive device which includes a machine readable indicia.

In an embodiment of the interactive play station, the read device determines the type based on the machine readable indicia.

In an embodiment of the interactive play station, the read device determines an orientation of the toy based on the indicia.

In an embodiment of the interactive play station, the read device detects an orientation of the toy and the content changes based on the orientation.

In an embodiment of the interactive play station, the read device detects movement of the toy and the content changes based on the movement.

In an embodiment of the interactive play station, the toy is incapable of digital communication with the display.

In an embodiment of the interactive play station, the toy is a plush toy.

In an embodiment of the interactive play station, the content is indicative of an action of the toy.

In an embodiment, the interactive play station further comprises a housing for the display.

In an embodiment of the interactive play station, the housing is designed to resemble a shower/bath and the content appears to be a water surface in the bath.

In an embodiment, the interactive play station further comprises an air blower, the air blower appearing to be a shower head.

In an embodiment of the interactive play station, when the air blower blows air onto the screen, the content changes to show water from the shower head impacting the water surface.

In an embodiment of the interactive play station, the play station also generates sounds in response to the presence of the toy.

In an embodiment of the interactive play station, the play station also generates scents in response to the presence of the toy.

In an embodiment of the interactive play station, the play station also generates tactile effects such as, but not limited to, steam, chemical mist, or vibration in response to the presence of the toy.

There is also disclosed herein, a method for interacting with a plush toy, the method comprising: providing a display, the display including; a screen for displaying a digitally generated image; and a read device, the read device being capable of detecting when a plush toy is positioned in proximity to the display; placing the plush toy in proximity to the screen; the read device detecting the presence of the toy; the display identifying the plush toy as a plush toy; and the display causing the screen to display digital content interactive with the plush toy.

There is also disclosed herein an interactive play station comprising: a housing designed to resemble a bathtub; a display, the display including; a screen for displaying a digitally generated image; and a read device, the read device being capable of detecting an object positioned in proximity to the display; wherein the display is positioned in the housing so that the screen is at a potential water surface in the bathtub; an air blower designed to resemble a shower head; and a plush toy incapable of digital communication with the display; wherein, when the plush toy is placed on the screen, the read device detects the presence of the plush toy; wherein, once the plush toy is detected the air blower is activated; and wherein a combination of the air blown by the air blower and content on the screen, the plush toy appears to be washed.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

In FIG. 2, there is provided fixed interactive devices in the form of rubber ducks which are shown having simulated moving feet.

DESCRIPTION OF THE PREFERRED EMBODIMENTS

Figure 1A:
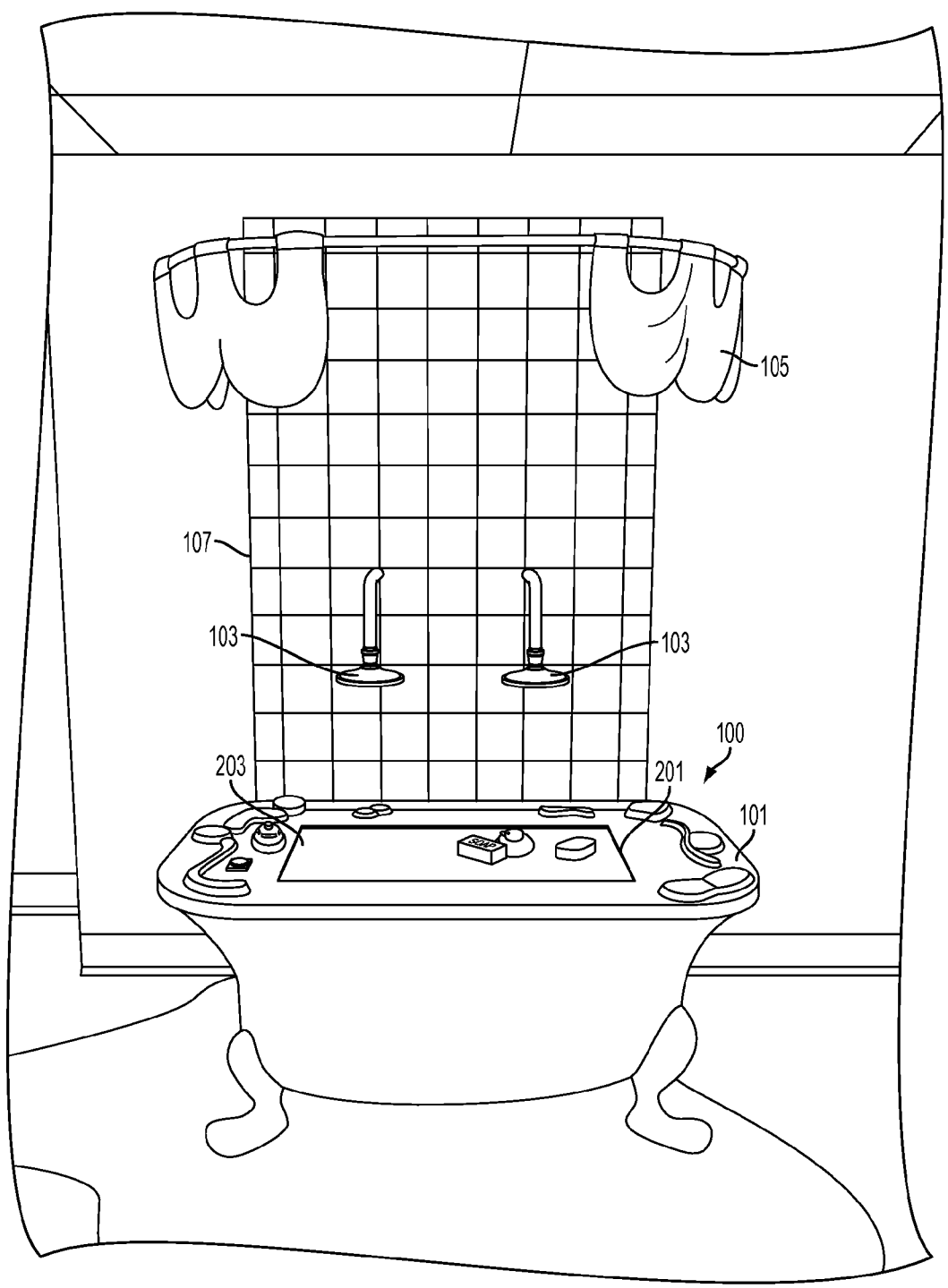
FIGS. 1A-1D provide a perspective view and six directional views of an embodiment of an interactive play station which is designed to emulate a bathtub and shower.
Figure 1B:
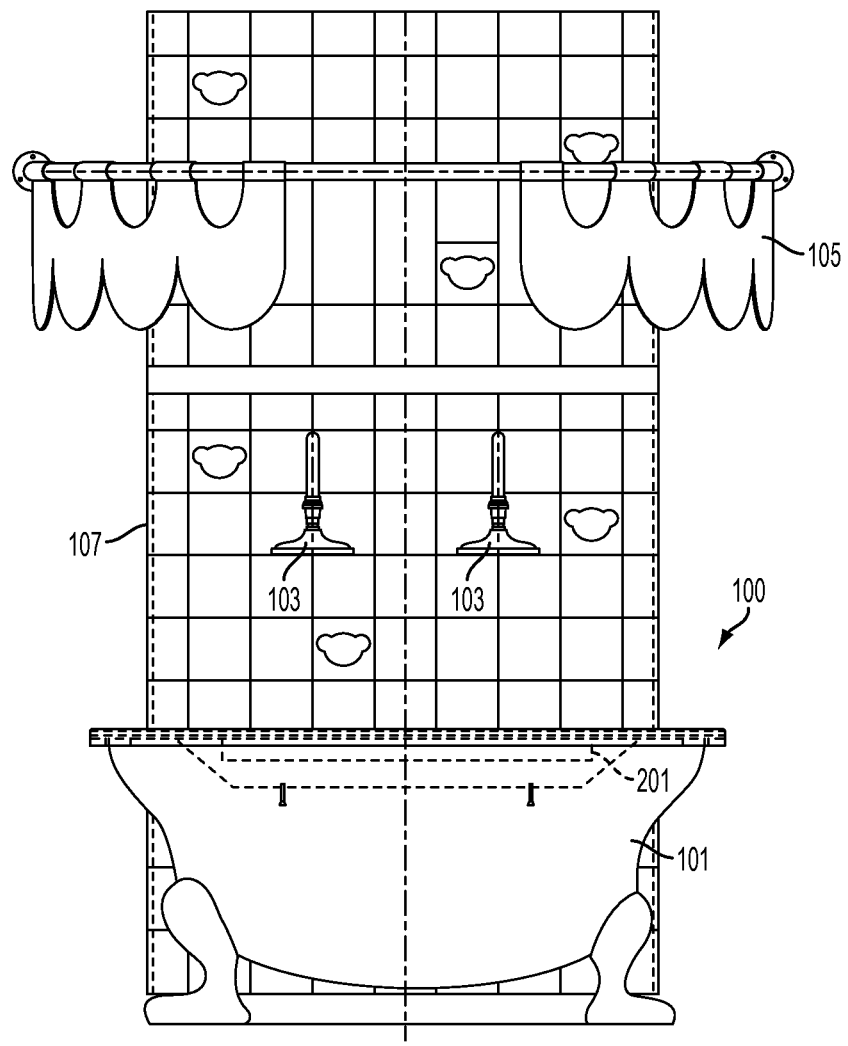
Figure 1C:
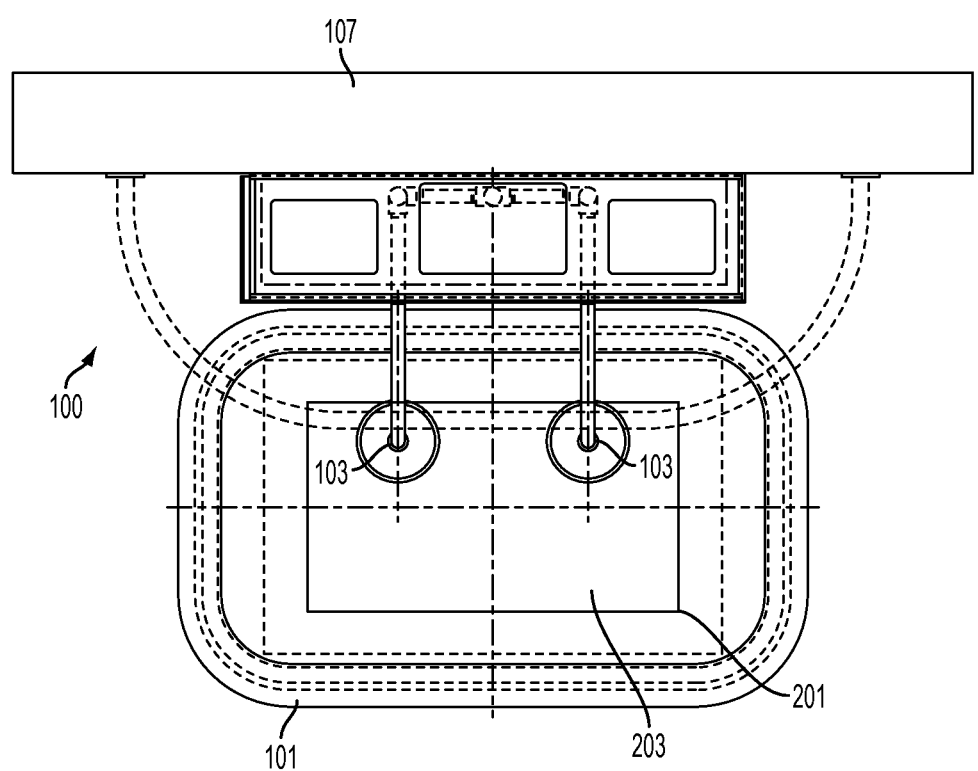
Figure 1D:
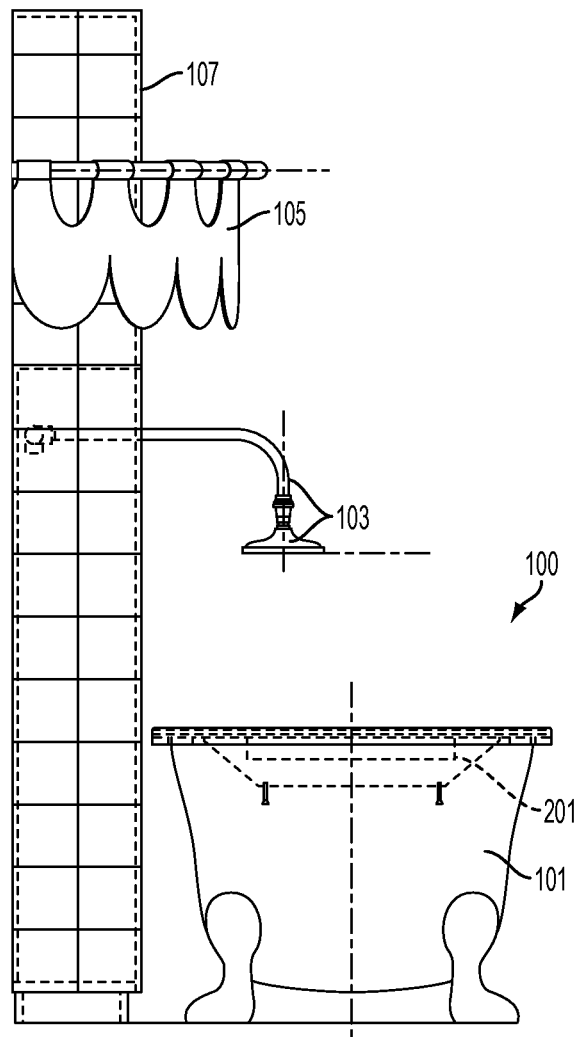

FIGS. 1A-1D provide an embodiment of an interactive play station (100) viewed from a variety of different directions. In these FIGS, the play station (100) is designed to resemble a modern shower-bath facility including a bath tub (101) and shower heads (103), but this is by no means required. The play station (100) may also include additional set dressings in the form of, for example, a shower curtain (105) and tile wall (107), so as to further resemble the standard room construction associated with modern bathing facilities.

The play station (100) may include both physical mechanical objects, as described above, and other types of bathroom objects such as an air blower, but also incorporates digital interface devices. In the embodiment of FIGS. 1A-1D, one such device is provided which is a digital flat screen display device (201) placed in the bath tub (101) so that its surface is at a height reasonable for allowing it to show a simulation of water in the bath tub (101) by a display on its screen or other surface. The display (201) may also include any associated computer components necessary to carry out its operation as would be understood by one of ordinary skill. This includes, but is not limited to, memory components, digital processors, or more standard interfaces. In the depicted embodiment, control of the play station (100) by the child is performed by having the screen's interactive touch surface (203) positioned at a position where it can effectively represent the plane of the surface of water in the bath tub (101) and having the child place and move objects on that surface. The display utilizes a read device such as, but not limited to, an interactive touch surface, a camera, a scanner (including a 3 dimensional scanner, a 2 dimensional scanner, and an infrared emitter and scanner), thermal sensors, sonic sensors (microphones) or other sensors to locate objects in proximity of the screen which are believed to be intended for interaction with the display. In this case, because they have been placed on the screen the display then presents digital material on the screen which is interactive with the position, movement, and/or orientation of the object.

The play station (100) of FIGS. 1A-1D is generally designed to be used as part of a plush toy manufacturing environment, such as those at Build-a-Bear Workshop™, but this is by no means required. Specifically, the play station (100) is intended to be used to "wash" a plush toy that a child has previously constructed (stuffed). As such, the play station (100) fulfills two purposes. For the child, the toy is "cleansed" after its assembly procedure which can help teach good hygiene procedures, bath-time routines, and other related skills. Further, for the child, there is a symbolic cleansing prior to playing with the toy. From a practical point of view, the play station can actually utilize air to both fluff the toy (improving its touch and feel) and to remove any dust or debris that may have gotten onto the toy prior to or during its assembly.

It is important to recognize that the play station (100), while emulating washing with water in the form of a standard shower or bath, does not utilize water in a preferred embodiment. This is because it is often undesirable to get a plush toy wet, particularly when the toy is likely to be carried by the child and needs to present a hygienic and inviting surface. However, the washing action does utilize the practical effect of forced air to air fluff the toy and therefore air is generally used to simulate water.

FIGS. 2-3 and 5-6 provide for various screen shots which show how the digital display (201) can be used to provide for an interactive play environment. In this disclosure, the display (201) is intended to interact with two classes of physical objects. Both classes are intended to be played with in conjunction with the environment. The first type of device is referred to as a "fixed interactive device" and the second is a "variable interactive device."

Figure 2:
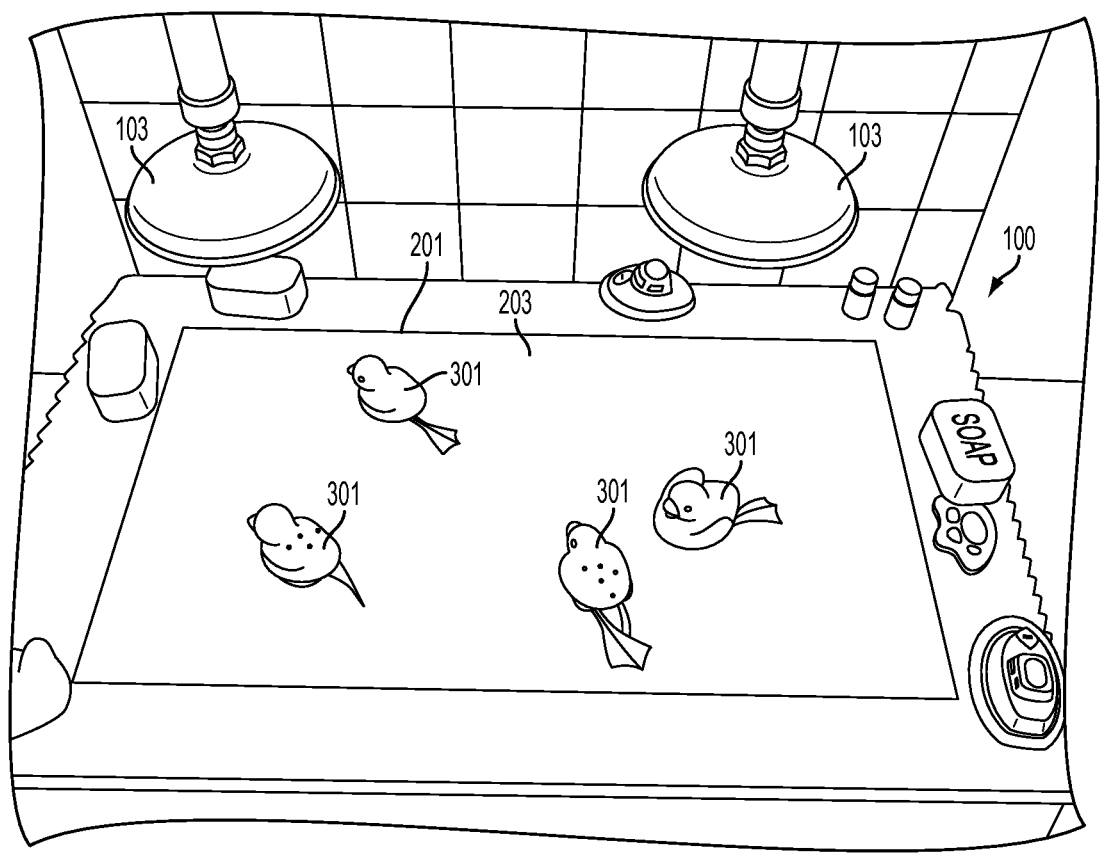
FIG. 2 provides a screen shot of an interactive computer screen acting as the water surface in the bathtub of FIGS. 1A-1D.
Figure 3:
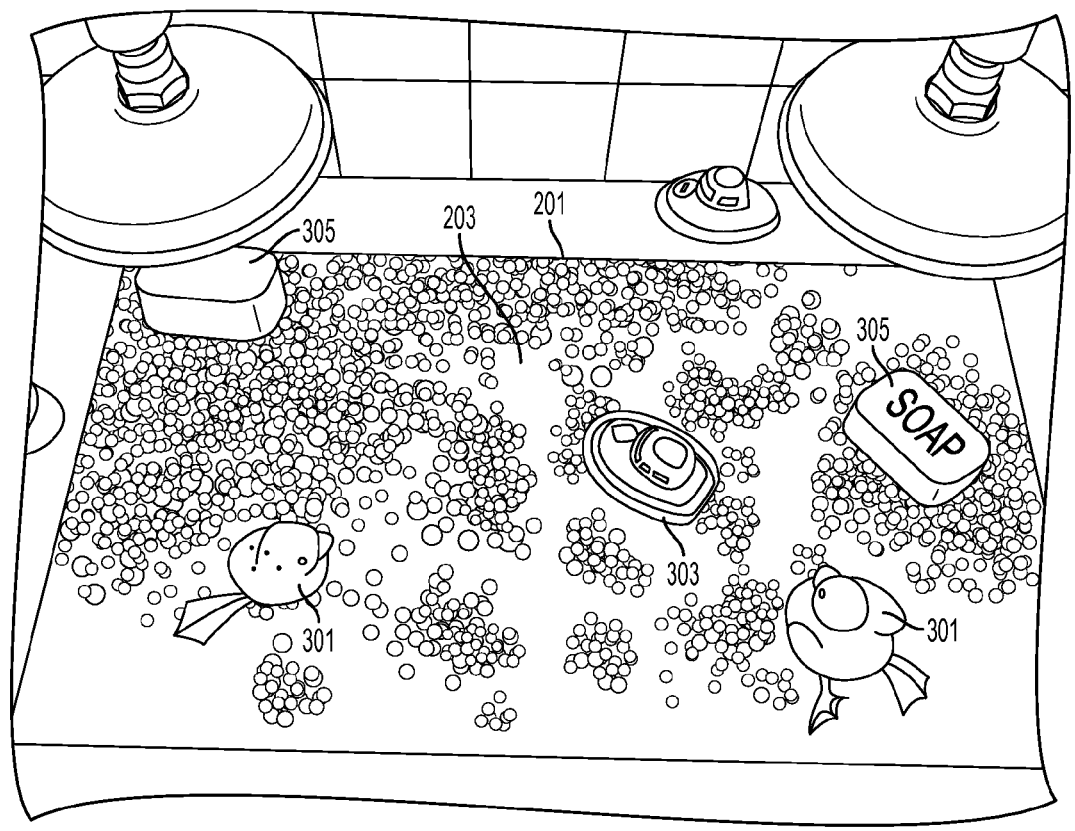
FIG. 3 provides a screen shot of the interactive computer screen of FIG. 2 interacting with multiple fixed interactive devices.

A "fixed interactive device" as that term is used herein, is an object which is designed to interact with the play station (100) and is predetermined. That is, a fixed interactive device will always be the same or of a controlled arrangement. FIGS. 2-3 provide for various interactions with fixed interactive devices, for example, a rubber duck (301), a toy tugboat (303), and a toy bar of soap (305), although these are by no means the only interactive devices which could be provided. These devices would generally be provided as part of the play station (100) (they are included with it) and are of a type which would commonly be found to interact with the environment of the play station (100). As shown in these FIGS., these items are all bathroom toys and representations of items that would commonly be found in a bathroom or bath. In an embodiment, the fixed interactive devices may actually be sold as self-contained toys for the child to use at home in a related environment (e.g., in a bath).

When a fixed interactive device is placed on the display (201), the display (201) will detect the object, identify it, and then provide a fixed play response in conjunction with it. The play response will generally be in the form of a display on the display (201) but this is by no means required and other responses may be provided in alternative embodiments. In FIG. 2, the rubber duck (301), when placed on the screen (201), will be provided with digital swimming feet. These will generally move with the duck (301) and will simulate the underwater appearance of a duck (301) "swimming" on the surface of the display (201). The display (201) or other components of the play station (100) may also provide sounds (e.g., such as quacking) or may trigger other interactive components. For example, the duck (301) may be pulled by a magnet toward a certain position, chemical fog may be provided as hot water "steam," or a thin water mist may be used to provide a wet sensation.

The simulation of duck feet in this FIG. provides that, when the child physically moves the duck (301), the duck (301) appears to swim in a manner of a real duck on water. As indicated above, it is important to note that moving the duck (301) does not make an avatar of a duck (301) move in a simulated environment; instead the physical duck (301) is moved and the screen simply provides animated feet, something that would not generally be available to a toy duck (301).

FIG. 3 provides for two additional fixed interactive devices. In this case, the devices are a toy tugboat (303) and a toy bar of soap (305). Similar to the rubber duck (301), when they are placed on the display (201), the display (201) may generate an interactive response. Thus, the tugboat (303) may have a defined visible "wake" on the display or produce a tugboat sound and the soap (305) may result in the creation of digital bubbles, the release of a soap or bubble bath scent, and/or vibration to simulate rushing water, for example.

As discussed above, it should be noted that the child's interaction during play is with a physical toy (301), (303), or (305) and is not with a screen simulation of the toy. Further, while the screen (201) is providing visual information to the child, the play station (100) may be providing other sensory information such as sounds (e.g., quaking or a tugboat horn), smells (e.g., a scent of bubble bath or soap), touch (e.g., vibration to simulate rushing water or blowing air), visual (e.g., blue lighting to simulate rushing water), or even tactile or taste feedback to the child. The play station (100), while being a simulated environment, is one in which multiple senses are generally engaged.

Figure 4:
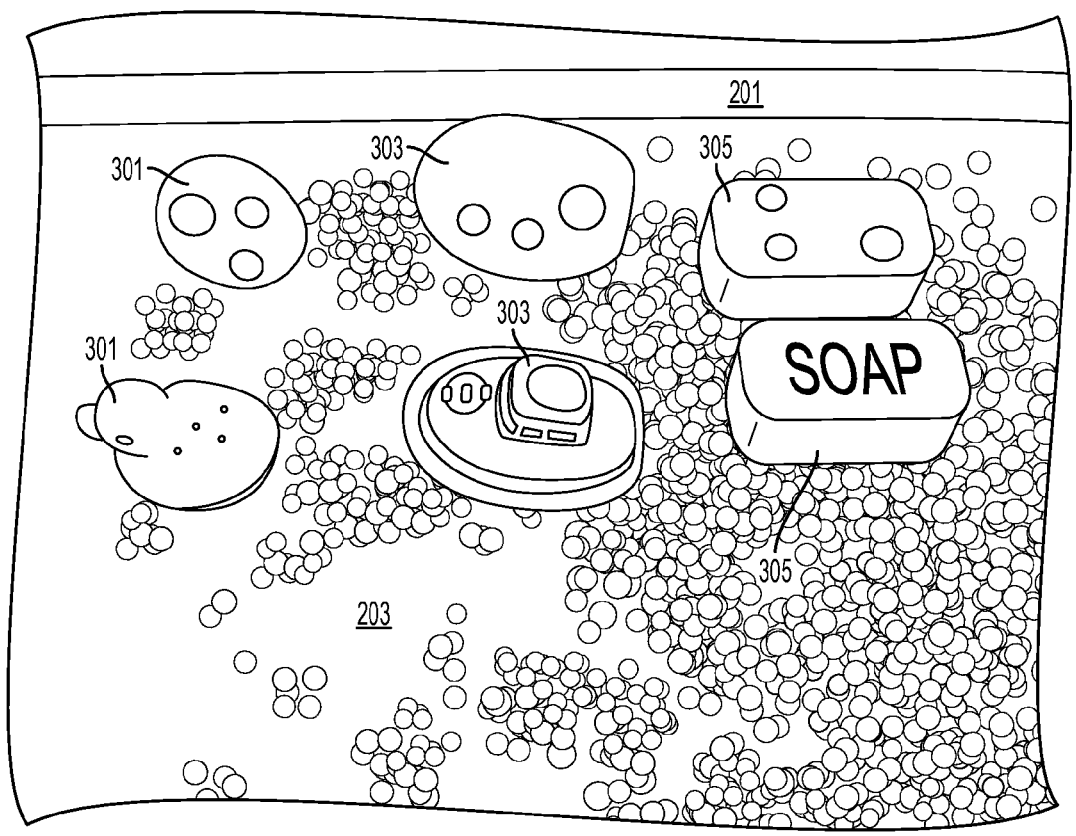
FIG. 4 shows machine identifiers on the fixed interactive devices of FIGS. 2 and 3.

A fixed interactive device (301), (303), or (305) such as those discussed above is intended for use with the play station (100) and therefore will include some form of control trigger for interacting with the display (201). While this may be a digital control chip or other digital device, in the depicted embodiment, each of the fixed devices includes machine identifiable indicia on its base. This is a simple identifier and allows for the fixed interactive devices to be readily sold for play outside of the play station (100). One embodiment of machine readable indicia is shown in FIG. 4 where the bases for each of the fixed interactive devices include a series of three white dots (two small and one large) on a black background. The contrasting images can be seen by a read device connected with the display (201) so that the fixed interactive device is definitively identified as the specific device when it is placed on the display (201). In this embodiment, the read device comprises an infrared emitter and scanner located in such a manner so as to read from the surface of the display (201). In one particular embodiment, the infrared emitter and scanner can be embedded within the display (201). The infrared emitter and scanner can be comprised of infrared layers embedded with light-emitting diodes. It will be understood that any infrared emitter and/or scanner could be utilized.

The dots in the base of each interactive device provides for two pieces of information. First, the play station (100) can identify what the fixed interactive device is (e.g., the duck (301), tugboat (303) or soap (305)), and second, the display can determine the fixed interactive device's orientation and movement. This allows the duck's (301) feet to appear under and behind it, for instance. An obvious advantage of using a specific machine readable code is allow the play station (100) to identify the specific device. This prohibits an inaccurate response to a toy, such as, for example, putting duck feet on a bar of soap.

Figure 5:
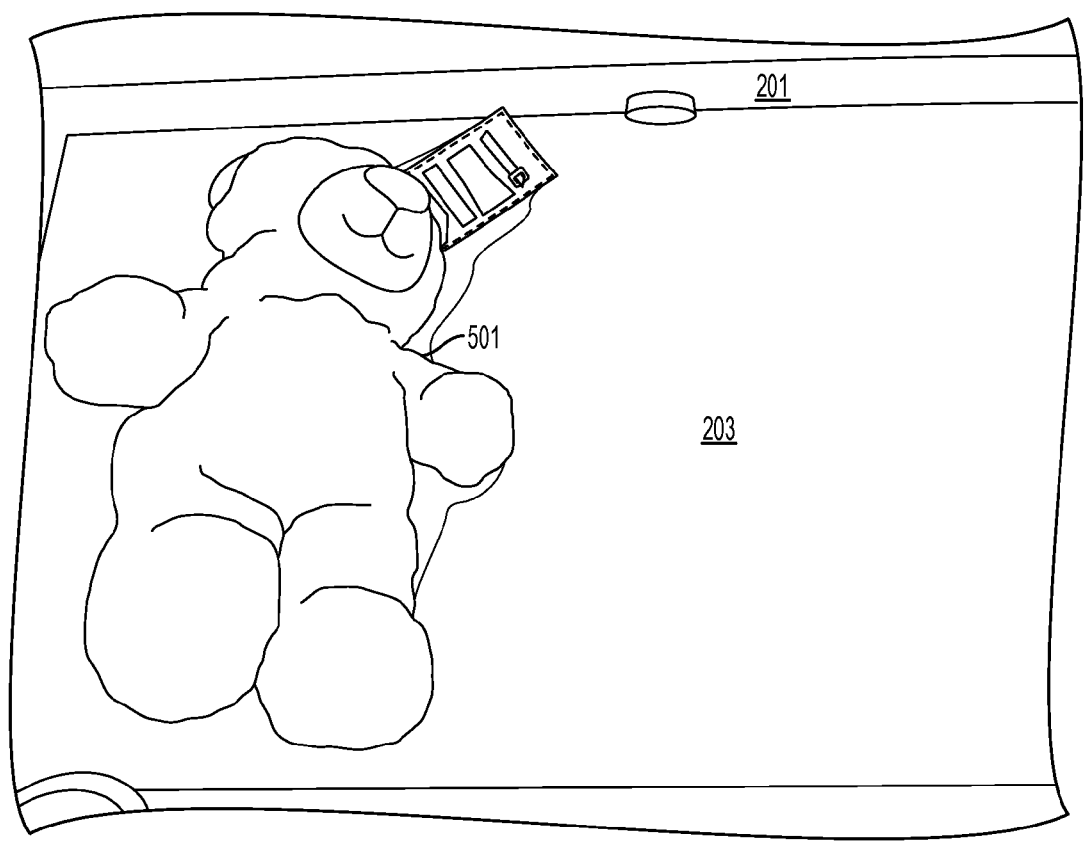
FIG. 5 provides a screen shot of the interactive computer screen of FIG. 2 interacting with a variable interactive device in the form of a plush toy.

While the inclusion of a fixed interactive device is desirable because the device will be an effective part of the play environment, it is also desirable for the play station (100) to interact with objects which are brought into the environment and which are not specifically designed to be used with it. In the depicted embodiment, these are referred to as "variable interactive devices." A variable interactive device is not specifically designed for use with the play station (100) and, as such, generally does not include machine readable indicia. Thus, the variable interactive device has to be identified by the play station (100) in a different manner. In FIG. 5, the variable interactive device comprises a plush toy (501) which the user has brought with them to "wash" in the tub.

As can be seen in FIG. 5, the display (201) is interacting with the plush toy. In this case, water is shown as splashing behind the toy (501). Further, in conjunction with such a display the shower head (103) (of FIG. 2) may provide an air stream onto the toy (501) with an associated sound of rushing water so that the play station (100) is acting as if the plush toy (501) is under a shower of water and multiple senses (tactile, audible, and visual) are all engaged. Thus, the plush toy (501) is able to interact with the play station (100) even though it is an object not designed for such interaction and it includes no digital components, no communication, and no machine readable indicia.

The plush toy (501) will generally be one of a variety of plush toys which may be difficult to individually identify. For example, it may be difficult to determine if the toy is a bear or a dog. Thus, in the embodiment of FIG. 5, the toy (501) is identified in a different manner than a fixed interactive device would be and the interactive components are designed to be more general. As shown in FIG. 4, the fixed interactive devices can be identified by the inclusion of their three relative disks. The variable device, in this embodiment, however, is identified by it having a general volume and/or shape. Specifically, the variable interactive device is identified simply as being roughly ellipsoidal and within certain size parameters.

This type of identification is obviously not perfect and it is possible that the play station (100) would misidentify a different device as a plush toy if it was placed on the display (201). For example, if a parent were to place his or her purse or bag on the display (201), it could be identified as a plush toy (501). However, this type of identification is generally useful for such variable interactive devices as it allows for a variety of different devices to have interaction with the play station (100) and, in this embodiment, the universe of expected outside objects being placed on the tub (101) is relatively small. That is, it is expected that an object placed on the tub (101) is a plush toy, as the tub is specifically indicated to be for washing plush toys.

Further, the reaction of the play environment can be more general for a variable device to allow for a more natural appearing response. As opposed to the duck (301), for example, where the display (duck feet) is very specific to the toy, the display of FIG. 5 is relatively general. It is simply splashing water which would be expected from any object (or no object) being placed under a shower head (103). Similarly, because the variable interactive device may have a variety of sizes, it is possible for the display to interact in a manner that uses the variable interactive device's variable nature to its advantage. For example, the splash effect could cover an area larger than the toy (501). In this way, the effect is always visible around the toy (501) where water would be expected to cascade off into the tub (101). However, the effect under the toy is blocked by the toy itself resulting in the illusion not being spoiled.

Figure 6:
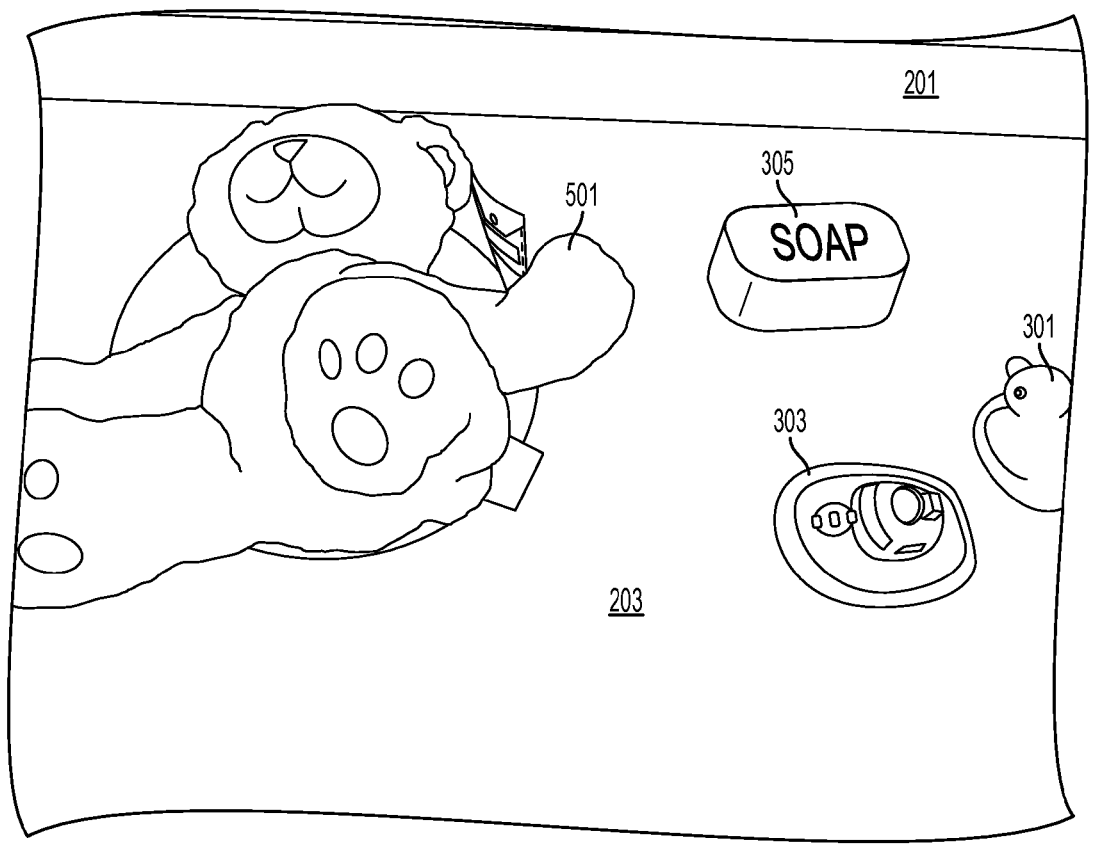
FIG. 6 shows a screenshot of the core identification criteria of both fixed and variable interactive devices.

It should be recognized that FIGS. 5 and 6 provide for merely a single example of variable interactive devices which can be generally identified. Other variable objects could also be identified. For example, a relatively small discrete point could be identified as a child's finger which could then be used to pop bubbles or tickle the duck's (301) feet. Regardless of whether such point was generated by a finger, a pen, or the corner of a cellular phone, as the interaction in this case is more general (e.g., a popped bubble or a small ripple), the display is appropriate for all these objects. Similarly, a hand-shaped image could be identified as a hand and trigger a sound instructing one to be careful not to fall into the tub. This response can be appropriate whether the hand was the child's, the parent's, or the plush toy's.

By allowing both fixed interactive devices (301), (303), and (305) which are effectively part of the play environment of the play station (100) and variable interactive devices (501) which are usually objects from a relatively small universe of likely objects, but which are brought in externally to the play station (100), the play station (100) can provide for an immersive play environment where digital and mechanical operations work together to provide a particular play activity having a fun, hands-on component. In effect, the play station (100) utilizes a digital simulation to provide visual play, while interacting with physical objects that may or may not be designed to interact with it. The play station (100) can do so in a manner that engages the user's senses in a much more direct environment than a pure screen simulation.

While in some embodiments it would be desirable for the play station (100) to be played with for an indeterminate length of time, in a situation, such as but not limited to as part of a retail toy manufacturing experience, it may be desirable to have play terminate after certain conditions occur or after a specified time period has elapsed. In this regard, the display (201) may show a representation of a plug being pulled in the tub (101) and that the "water" is draining. This representation on the display (201) would be designed to terminate the play experience and end the session. Specifically, the play is terminated because the tub (101) no longer has water and, thus, it would not be expected to be interactive with the user. A tub (101) without water would presumably have no expected interaction as there is no water to interact with. Termination of the visual display (and any other associated sensory displays), thus, provides a cue that play at the play station (100) is over and the child should go do something else.

After a period of time has elapsed, the play station (100) can reset (either in a simulation of filling the tub (101), or simply a reset sequence where the tub (101) simply goes from empty to full) to await the next user. Alternatively, it may be desirable to have the play terminate after a specified time period has elapsed or when all tasks have been completed, for example, when the play station (100) comprises a task-based "game." In such a situation, the user may have a specified period of time to complete a variety of tasks before the time has elapsed. For example, after the time period begins, the user may have a list of designated tasks and the play station (100) may instruct the user to complete the same. Such tasks could include, for example, "use the soap," "wash behind the ears," "dry off," and the like. The play would be completed either when time has elapsed or when the user has completed all the tasks.

It should be recognized that, while the disclosure above is focused on the play station (100) interacting with non-digital devices in the form of fixed interactive devices (301), (303), or (305) and variable interactive device (501), the play station (100) can, in an embodiment, also interact with other digital devices which are capable of more advanced communication. For example, the play station (100) may be able to retrieve information from other networked or otherwise paired devices to provide for sharing of information from the play station (100) to other stations in an interactive play environment, or may be able to receive information from a user device, such as, but not limited to, a Smartphone (e.g., via a Bluetooth or cellular connection), a tablet computer (e.g., connecting to the tub via the Internet), or a digital component in the toy itself. For example, if the toy has a name which has been entered into a networked digital device, the play station (100) may refer to the toy by name. This provides a further level of interactivity if the toys brought to the tub are capable of such enhanced interaction.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. An interactive play station comprising:
   a display, said display including;
      a screen for displaying a digitally generated image; and
      a read device, said read device being capable of detecting an object positioned in proximity to said display;
   a housing for said display; and
   a toy;
   wherein, when said toy is placed in proximity to said screen, said read device detects the presence of said toy;
   wherein, once said toy is detected, said toy is identified as a particular type of toy;
   wherein, once said type is identified, said display causes said screen to display digital content interactive with said toy; and
   wherein said housing is designed to resemble a shower/bath and said content appears to be a water surface in said bath.

2. The interactive play station of claim 1, further comprising an air blower, said air blower appearing to be a shower head.

3. The interactive play station of claim 2, wherein when said air blower blows air onto said screen, said content changes to show water from said shower head impacting said water surface.

4. An interactive play station comprising:
   a housing designed to resemble a bathtub;
   a display said display including;
      a screen for displaying a digitally generated image; and a read device, said read device being capable of detecting an object positioned in proximity to said display;

wherein said display is positioned in said housing so that said screen is at a potential water surface in said bathtub;

an air blower designed to resemble a shower head; and a plush toy incapable of digital communication with said screen;

wherein, when said plush toy is placed on said screen, said read device detects the presence of said plush toy;

wherein, once said plush toy is detected said air blower is activated; and wherein a combination of said air blown by said air blower and content on said screen, said plush toy appears to be washed.

* * * * *

UNITED STATES PATENT AND TRADEMARK OFFICE
CERTIFICATE OF CORRECTION

PATENT NO.       : 9,072,973 B2                                     Page 1 of 1
APPLICATION NO.  : 13/792107
DATED            : July 7, 2015
INVENTOR(S)      : Elliott It is certified that error appears in the above-identified patent and that said Letters Patent is hereby corrected as shown below:

On the Title Page
Item (73) Assignee
Change "MI" to --MO--

Signed and Sealed this
Thirteenth Day of October, 2015

Michelle K. Lee
*Director of the United States Patent and Trademark Office*